United States Patent [19]

Kim

[11] Patent Number: 5,930,402
[45] Date of Patent: Jul. 27, 1999

[54] METHOD AND DEVICE FOR LOCAL CONTRAST ENHANCEMENT OF VIDEO SIGNAL

[75] Inventor: Yeong-Taeg Kim, Suwon, Rep. of Korea

[73] Assignee: Samsung Electronics Co., Ltd., Kyungki-do, Rep. of Korea

[21] Appl. No.: 08/760,764

[22] Filed: Dec. 5, 1996

[30] Foreign Application Priority Data

Dec. 13, 1995 [KR] Rep. of Korea ................... 95/49345

[51] Int. Cl.$^6$ ........................................... G06K 9/40
[52] U.S. Cl. ..................... 382/274; 358/447; 358/463; 348/241; 348/607; 348/678
[58] Field of Search ................... 358/461, 447, 358/448, 463; 382/274, 260, 270, 264; 348/251, 252, 253, 241, 606, 607, 673, 674, 678, 686, 597

[56] References Cited

U.S. PATENT DOCUMENTS

| 4,825,297 | 4/1989 | Fuchsberger et al. | 358/284 |
| 5,317,427 | 5/1994 | Ichikawa | 358/520 |

FOREIGN PATENT DOCUMENTS

| A10098319 | 1/1984 | European Pat. Off. | G03F 3/08 |
| 2061660 | 10/1979 | United Kingdom | H04N 5/14 |
| 2160065 | 12/1985 | United Kingdom | H04N 1/40 |
| 2195857 | 4/1988 | United Kingdom | H04N 1/40 |
| 8103096 | 4/1981 | WIPO | H04N 5/14 |

*Primary Examiner*—Joseph Mancuso
*Assistant Examiner*—Ephrem Alemu
*Attorney, Agent, or Firm*—Sughrue, Mion, Zinn, Macpeak & Seas, PLLC

[57] ABSTRACT

A method and a device for adaptively performing local contrast enhancement by weighing a video signal according to the magnitude of the local contrast of the video signal and by adding the weighted signal to the original video, thereby being capable of outputting the original signal intact regardless of the size of the local contrast. The device for enhancing a local contrast in a video signal processor has an M×N window processor for generating an M×N window signal calculated from an input video signal; an M×N lowpass filter for lowpass-filtering an M×N window signal generated in the M×N window processor; a first adder for calculating the difference between the output of the M×N lowpass filter and a central output of the M×N window processor, where the difference represents contrast which is visually perceptible to a human; an absolute circuit for converting the output of the first adder into its absolute value, thereby setting the high contrast area and the low contrast area; a weigher for outputting a weight value depending on the output of the absolute circuit; a multiplier for multiplying the output of the first adder by the output of the weigher; and a second adder for adding the central output of the M×N window processor to the output of the multiplier.

6 Claims, 3 Drawing Sheets

METHOD AND DEVICE FOR LOCAL CONTRAST ENHANCEMENT OF VIDEO SIGNAL

BACKGROUND OF THE INVENTION

1. Field of the Invention

The present invention relates to a method and device for local contrast enhancement in a video signal processing system, and more particularly to a method and a device for adaptively performing local contrast enhancement by weighing a video signal according to the magnitude of the local contrast of the video signal and by adding the weighted signal to an original signal. The present application is based upon Korean Application No. 49345/1995, which is incorporated herein by reference.

2. Description of the Related Art

Generally, the image quality of a video signal deteriorates because of several factors. For example, low contrast can result in the deterioration of the quality of an image. Gamma correction and histogram equalization are examples of methods for correcting low contrast. Use of these methods can enhance contrast, but while these methods effect an overall contrast enhancement of the video signal, they cannot optically accompany local contrast enhancement.

The prior art method for local contrast enhancement is to lowpass-filter the input video signal and to add the lowpass-filtered value to the enhanced contrast value. The above method is disclosed in U.S. Pat. No. 4,825,297 issued to Fuchsberger. FIG. 1 is a diagram illustrating the construction of a prior art circuit which uses a lowpass filter for acquiring an enhanced local contrast of a video signal. A final output g of FIG. 1 is obtained according to the following expression (1).

$$g = K1(m) + K2(f-m) \quad (1)$$

wherein, K1 and K2 designate characteristic curves, m designates an output of the lowpass filter, f designates an input of the lowpass filter, and g designates the final output of the lowpass filter.

In the above expression (1), K2 (f−m) has the characteristic as shown in FIG. 2, which is a diagram illustrating the non-linear amplification characteristics curve K2 in a prior art high-pass channel.

In the above U.S. Patent, the local contrast (f−m) is adaptively weighted and the lowpass-filtered signal (m) is added to the local contrast weighted by a factor of K1, thereby outputting an output signal. The reason that the local contrast is adaptively weighted is to prevent deterioration of the image quality and excessive enhancement of the local contrast due to an increased noise level. In other words, if the local contrast is less than an arbitrary value, that is, if A2<f−m<A1 (herein, A1 and A2 are given constants), there is noise in the contrast. In this case, to prevent the noise from being increased, no contrast enhancement is performed. That is, k2(f−m)=0. If the local contrast is greater than the arbitrary value after splitting the local contrast area, in order to reduce an increase of the noise, the contrast should be over-enhanced.

Since the value of the local contrast corresponds to the sum of the lowpass-filtered signal and the adaptively weighted local contrast, there are limits to the application of this technique, as can be seen from the following examples.

(a) When the value of the local contrast is low, the contrast can be generated due to the noise. Thus, the input video signal is outputted unchanged by contrast enhancement. Namely, g=f.

(b) When the value of the local contrast is high, the contrast of the input signal is sufficient. Thus, the input video signal is outputted unchanged by enhancement of the contrast. Namely, g=f.

In the foregoing patent, the above function is not performed because the lowpass-filtered signal constructs the output signal. In the case of (a), the output signal g=m and in the case of (b), g≈m. At a result, blurring is caused in the above cases (a) and (b), and it is preferable not to perform the above function.

SUMMARY OF THE INVENTION

It is accordingly the object of the prevent invention to provide a method and a device for adaptively performing local contrast enhancement by differently weighing a video signal according to the size of the local contrast of the video signal and by adding the weighted signal to an original signal, thereby having the capability of outputting the original signal unchanged regardless of the degree of local contrast.

The above object of the present invention can be accomplished with a device for enhancing a local contrast in a video signal processor, comprising: an M×N window processor for generating an M×N window signal calculated from a video signal applied to a video signal input terminal, the M×N window defined according to the following expression (2):

$$W = \begin{vmatrix} W_{11}, & W_{12}, & \ldots & W_{1N} \\ W_{21}, & W_{22}, & \ldots & W_{2N} \\ W_{M1}, & W_{M2}, & \ldots & W_{MN} \end{vmatrix}; \quad (2)$$

an M×N lowpass filter for lowpass-filtering the M×N window signal generated in the M×N window processor; a first adder for calculating the difference between the output of the M×N lowpass filter and a central output of the M×N window processor and for setting the above difference as the contrast which a user can visually perceive; an absolute value circuit for converting the output of the first adder into its absolute value, thereby setting the high contrast area and the low contrast area; a weigher for outputting a weight value depending on the output of the absolute value circuit; a multiplier for multiplying the output of the first adder by the output of the weigher; and a second adder for adding the central output of the M×N window processor to the output of the multiplier.

Further, the object of the present invention can be accomplished with a method for enhancing a local contrast in a video signal processor, wherein the local contrast of the video signal is detected as the difference between a current sample and an average value of peripheral samples and the contrast is adaptively enhanced as the detected value of the local contrast, thereby preventing the image quality from deteriorating due to the low local contrast of the video signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1:
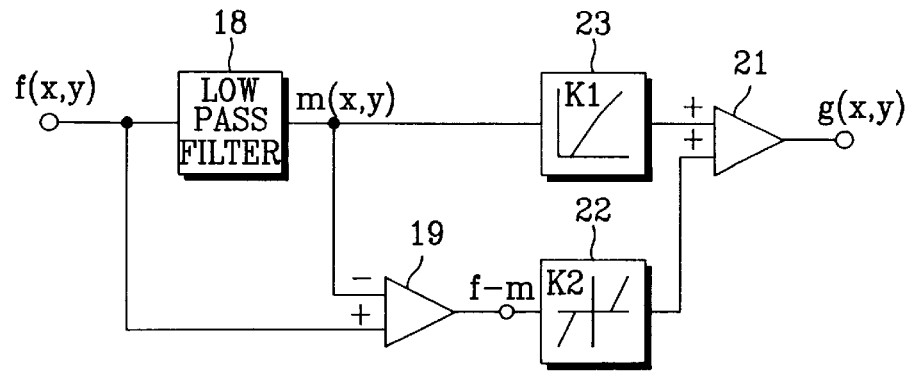
FIG. 1 is a diagram illustrating the construction of a circuit using a lowpass filter for acquiring an enhanced local contrast of a prior art video signal.
Figure 2:
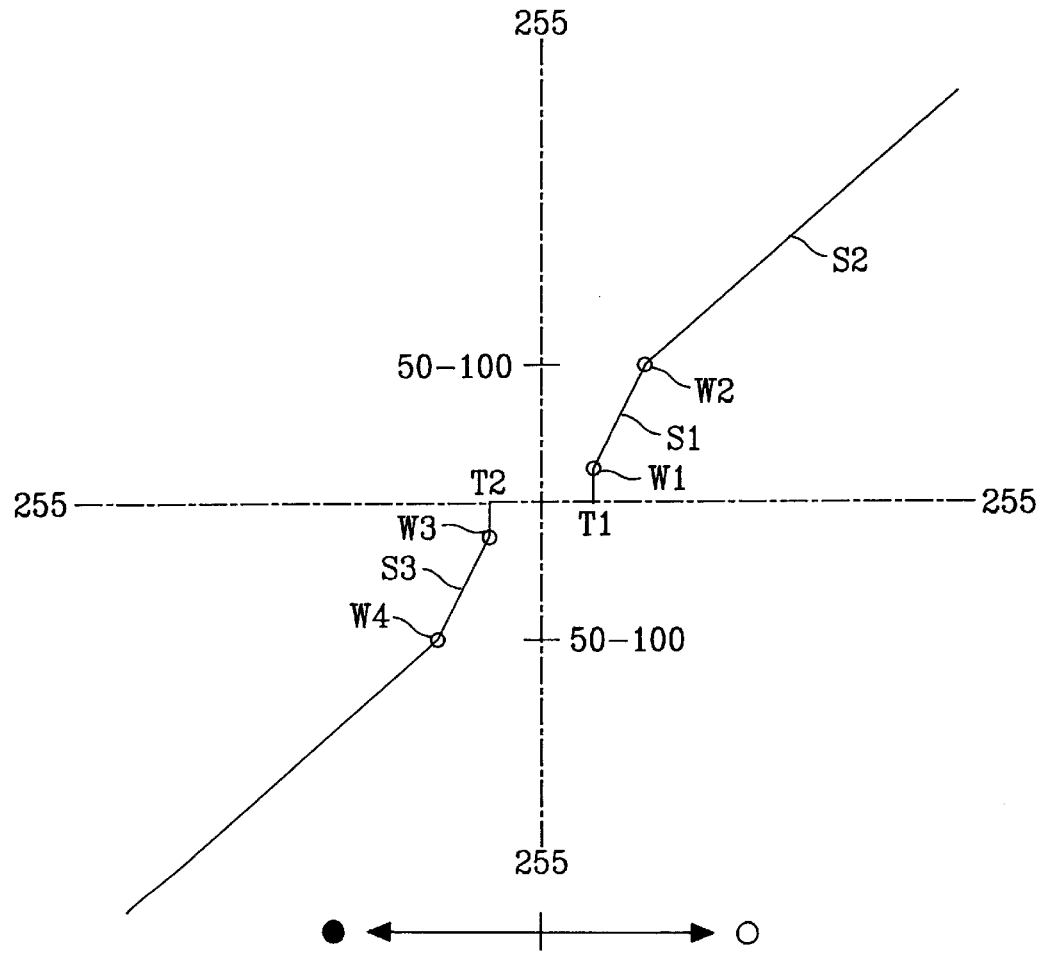
FIG. 2 is a diagram illustrating the non-linear amplification characteristics curve K2 in a prior art high-pass channel.

It is noted that throughout the drawings the same reference numerals and letters are used to designate like or equivalent elements having the same function. Further, in the following description, numerous specific details, such as particular components of the circuit and examples of the signal frequency, are set forth to provide a more thorough understanding of the present invention. It will be apparent, however, to one skilled in the art that the present invention may be practiced without these specific details. The detailed description of known functions and constructions which would unnecessarily obscure the subject matter of the present invention are omitted in the present specification.

Figure 3:
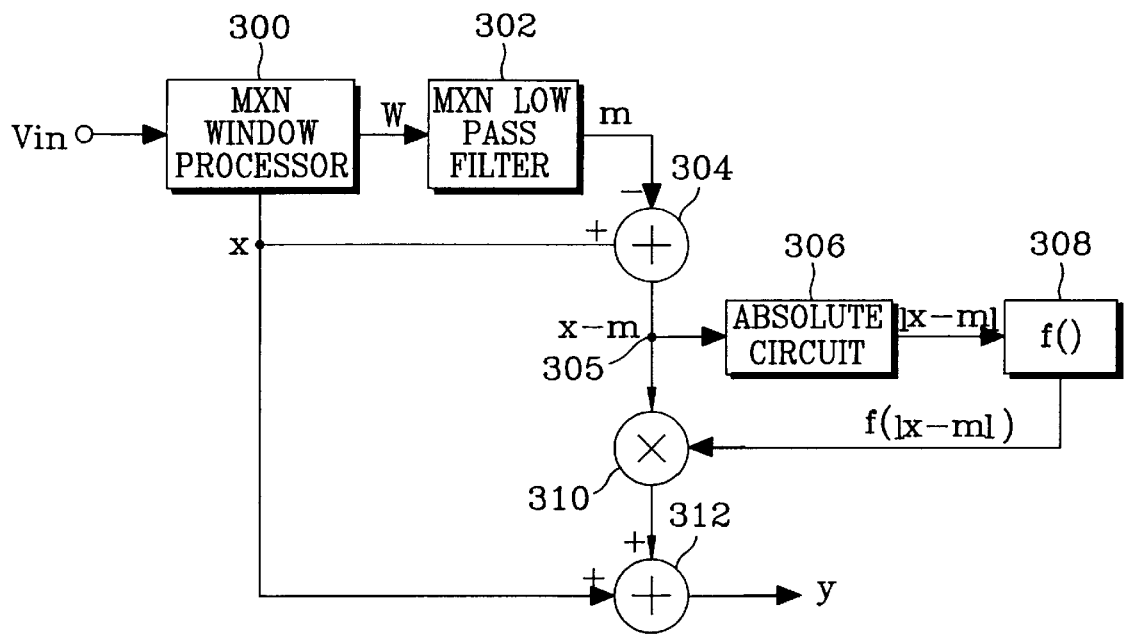
FIG. 3 is a circuit diagram illustrating the construction of a circuit for local contrast enhancement of a video signal according an embodiment of the present invention.

FIG. 3 is a circuit diagram illustrating the construction of a circuit for local contrast enhancement of a video signal according to an embodiment of the present invention.

When the video signal is inputted through the video signal inputting terminal Vin, the M×N window processor 300 generates the M×N window W as expressed in expression (2) and inputs the generated M×N window signal W to the M×N lowpass filter 302.

$$W = \begin{vmatrix} W_{11}, & W_{12}, & \ldots & W_{1N} \\ W_{21}, & W_{22}, & \ldots & W_{2N} \\ W_{M1}, & W_{M2}, & \ldots & W_{MN} \end{vmatrix} \quad (2)$$

While the rectangular M×N window format is provided as an example of W, the window format of W is not limited to this configuration.

Figure 4:
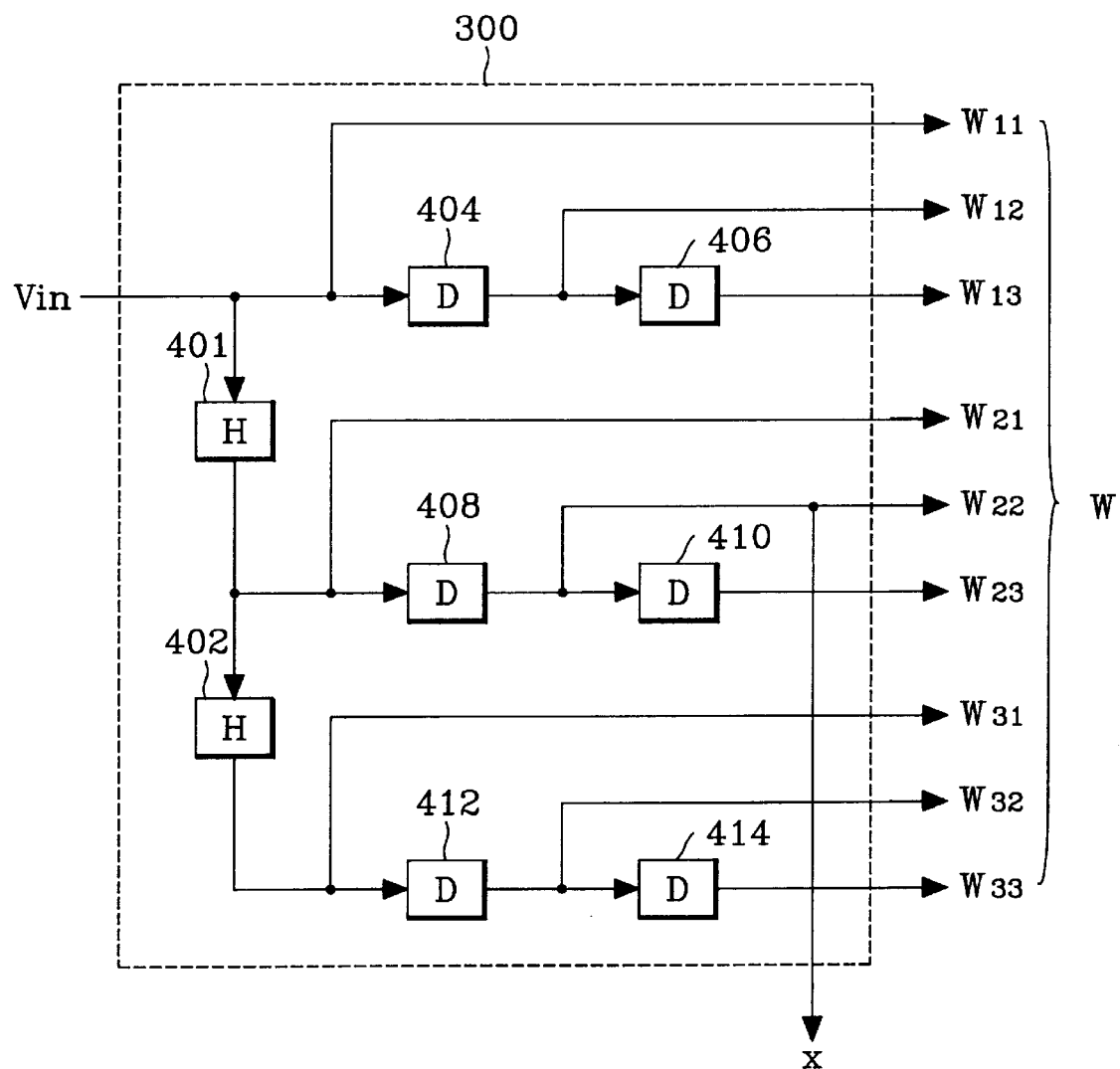
FIG. 4 is a detailed circuit diagram illustrating an M×N window processor 300 of FIG. 3; and, FIG. 5 is a diagram illustrating the weight function according to the present invention.

The central sample x of the M×N window W is inputted to two adders 304 and 312. Herein, the above central sample x is represented as an input sample for the contrast enhancement. The detailed circuit of the M×N window processor 300 in the case that M=N=3 is illustrated in FIG. 4. In FIG. 4, D designates a sample delay unit and H designates a horizontal delay line, respectively. The output signal m of the M×N lowpass filter 302 in FIG. 3 is designated as $$\sum_{i=1}^{M} \sum_{j=1}^{N} a_{ij} W_{ij}.$$

Here, $a_{ij}$ is a preset coefficient. The difference x−m between the central sample x of the M×N window processor 300 and the output signal m of the M×N lowpass filter 302 is generated in the adder 304 and serves as the contrast which is visually perceptible. That is to say, x−m is defined as the local contrast. In order to detect the high area or low area of the local contrast, the magnitude of the value x−m is outputted as an absolute value from the absolute circuit 306.

An area where |x−m| is high is indicated as the high area and an area where |x−m| is low is indicated as the low area. In the present invention, the local contrast can be enhanced in the weigher 308 according to the local contrast as defined above, by the following method. As can be seen in FIG. 3, the signal |x−m| is amplified according to the expression f(|x−m|) by the weigher 308, the amplified value f(|x−m|) is multiplied by the value |x−m| by multiplier 310, the multiplied value {(x−m)f(|x"m|)} is added to the original signal x by adder 312, and finally, the output video signal y is defined by the following expression (3).

$$y = x + f(|x-m|)(x-m) \quad (3)$$

Here, since the function f( ) is the weighing function, it is a function of |x−m|. The present invention can obtain various local contrast enhancement characteristics by properly selecting the weighing function. For instance, if f(|x−m|)=0, y=x. In other words, on the condition that there is no contrast enhancement effect, if |x−m|<0, f(|x−m|)=K. Also, similar to the above condition, if |x−m|>T, f(|x−m|)=0. Here, T and K are constants. In the contrast enhancement method defined in the latter expression, the local contrast is amplified in the area where the local contrast is low, but an adaptive contrast enhancement which passes through the input sample x is performed in the area where the local contrast is high.

$$f(|x-m|) \neq 0, \text{ if } T1 < |x-m| < T2,$$

and $$f(|x-m|) = 0, \text{ otherwise.}$$

Here, T1 and T2 are threshold values. In the device for enhancing the local contrast according to the present invention, if the local contrast is less than an arbitrary value T1, it is detected as the local contrast of the noise. Following that, after the input sample x passes unchanged, if the local contrast is greater than the arbitrary value, the local contrast is sufficient as described above. As a result, the input sample is passed unchanged.

Figure 5:
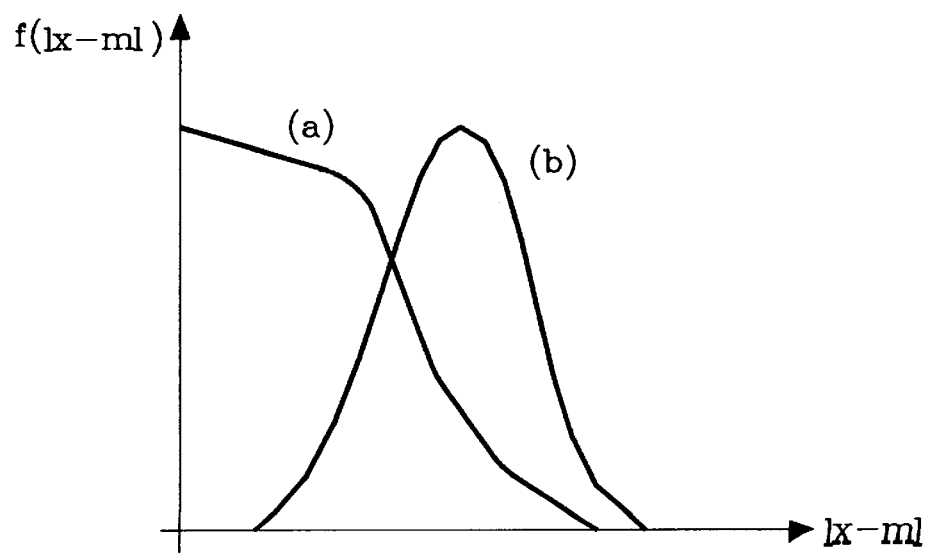

The above example of the weighing function is illustrated in FIG. 5. More generally, it should be noted that various contrast enhancement characteristics can be embodied using the same weighing function.

As is apparent from the foregoing, the present invention provides advantages in that the local contrast of the video signal is defined as the difference between the current sample and the average value of the peripheral samples, and the contrast is adaptively enhanced as the value of the local contrast, thereby preventing the image quality from deteriorating due to the low local contrast of the video signal.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for enhancing local contrast of a video signal processor, comprising the steps of:

detecting a difference between a lowpass-filtered signal and an input signal as said local contrast of said video signal;

adaptively amplifying said local contrast according to the magnitude of said detected local contrast to produce an amplified contrast signal;

multiplying said amplified contrast signal with said local contrast to produce a multiplied signal; and adding said multiplied signal to the input signal to produce an output video signal having enhanced contrast.

2. The method as recited in claim 1, wherein said lowpass-filtered signal is an output of a window which has been lowpass-filtered, said input signal is a central sample of said window, and said local contrast is set by subtracting the lowpass-filtered signal from the input signal.

3. The method as recited in claim 2, wherein said window is a rectangular window having dimensions of M×N.

4. The method as recited in claim 3, wherein M=N=3.

5. A device for enhancing a local contrast in a video signal processor, comprising:

an M×N window processor for generating an M×N window signal calculated from an input video signal according to the following expression:

$$W = \begin{vmatrix} W_{11}, & W_{12}, & \ldots & W_{1N} \\ W_{21}, & W_{22}, & \ldots & W_{2N} \\ W_{M1}, & W_{M2}, & \ldots & W_{MN} \end{vmatrix};$$

an M×N lowpass filter for lowpass-filtering an M×N window signal generated in said M×N window processor;

a first adder for calculating a difference between the output of said M×N lowpass filter and a central output of said M×N window processor, wherein said difference represents a visually perceptible contrast;

an absolute value circuit for converting said output of said first adder into its absolute value;

a weigher for outputting a weight value depending on said output of said absolute value circuit;

a multiplier for multiplying said output of said first adder by said output of said weigher; and a second adder for adding the central output of said M×N window processor to said output of said multiplier.

6. The device as recited in claim 5, wherein said M×N window processor comprises:

first and second horizontal line delay units for delaying lines one by one to separate lines from said video signal inputting terminal; and first to sixth sample delay units for delaying pixels of each respective line separated by said first and second horizontal line delay units.

\* \* \* \* \*